Nov. 2, 1965 H. P. KILROY 3,215,983

TAPE CONTROLLED POSITIONING APPARATUS

Filed Feb. 9, 1960 4 Sheets-Sheet 1

INVENTOR.

Henry P. Kilroy

BY

Wolfe, Hubbard, Voit & Osann

Attys.

TAPE CONTROLLED POSITIONING APPARATUS

Filed Feb. 9, 1960 4 Sheets-Sheet 2

INVENTOR.
Henry P. Kilroy
BY
Wolfe, Hubbard, Voit & Osann
Attys.

Nov. 2, 1965 H. P. KILROY 3,215,983

TAPE CONTROLLED POSITIONING APPARATUS

Filed Feb. 9, 1960 4 Sheets-Sheet 3

INVENTOR.

Henry P. Kilroy

BY

Wolfe, Hubbard, Voit & Osann attys.

INVENTOR.
Henry P. Kilroy
BY
Wolfe, Hubbard, Voit & Osann
Attys.

United States Patent Office 3,215,983

Patented Nov. 2, 1965

3,215,983

TAPE CONTROLLED POSITIONING APPARATUS

Henry P. Kilroy, Littleton, Mass., assignor to Giddings & Lewis Machine Tool Company, Fond du Lac, Wis., a corporation of Wisconsin Filed Feb. 9, 1960, Ser. No. 7,632
8 Claims. (Cl. 340—147)

The present invention relates in general to apparatus responsive to digitally represented information for controlling a changeable condition, for example, apparatus which accepts signals digitally representing successive positions and translates a movable member to the position represented by such signals. More particularly, the invention is concerned with the handling of successive input signals derived from a digital record, such as a punched tape, prepared in advance.

It is the general aim of the invention to provide apparatus of the type described which ignores erroneous sets of information on a record device, and which responds only to complete, correct sets of information.

A related object is to greatly facilitate and simplify the preparation of a digital record, e.g., punched tape, which carries digital representations of values or changes to be effected in a variable condition. More specifically, an object of the invention is to make it possible for character representations erroneously applied to a record device to be left thereon, without the need to erase or delete such representations, but with the need only to apply a complete and correct set of representations to the record subsequent to any error which is made. This reduces the time and effort of an operator who prepares the digital record from numerical program data.

Another object of the invention is to provide a system responsive to successive sets of data signals which are preceded by a prefix signal, and in which data signals received prior to any prefix signal are cleared or destroyed within the system when that prefix signal occurs.

A further object of the invention is to provide such a system in which the response to received data signals is initiated only when a suffix code signal is received, so that the system acts only on the last set of data signals which it receives prior to a suffix code.

Still another object of the invention is to provide such a system in which any one of several different suffix code signals not only initiates response to previously received data signals, but also selectively actuates different corresponding auxiliary devices.

Another object of the invention is to make such a system disregard any suffix code which is not complete. More specifically, it is an object to facilitate the preparation of a digital record by voiding only the last character representation in an erroneous suffix code group, and causing a "void" signal to clear or destroy any previously received suffix code information which is held in the system.

Other objects and advantages will become apparent as the following description proceeds, taken in conjunction with the accompanying drawings, in which.

Figure 5A:
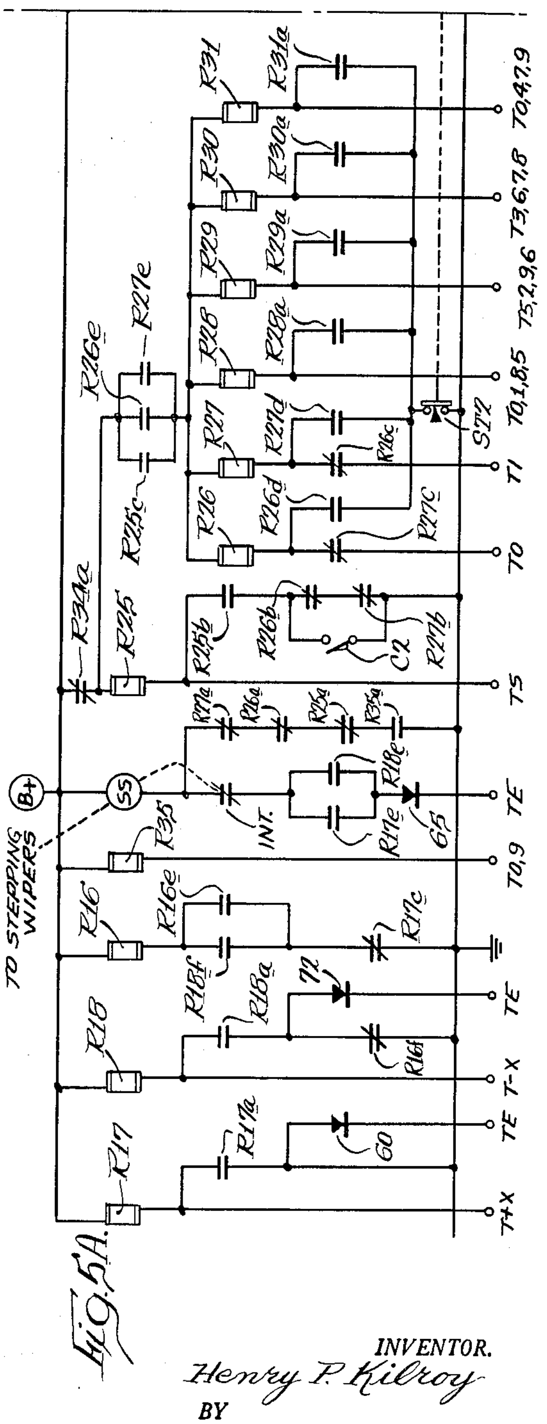
Figure 6:
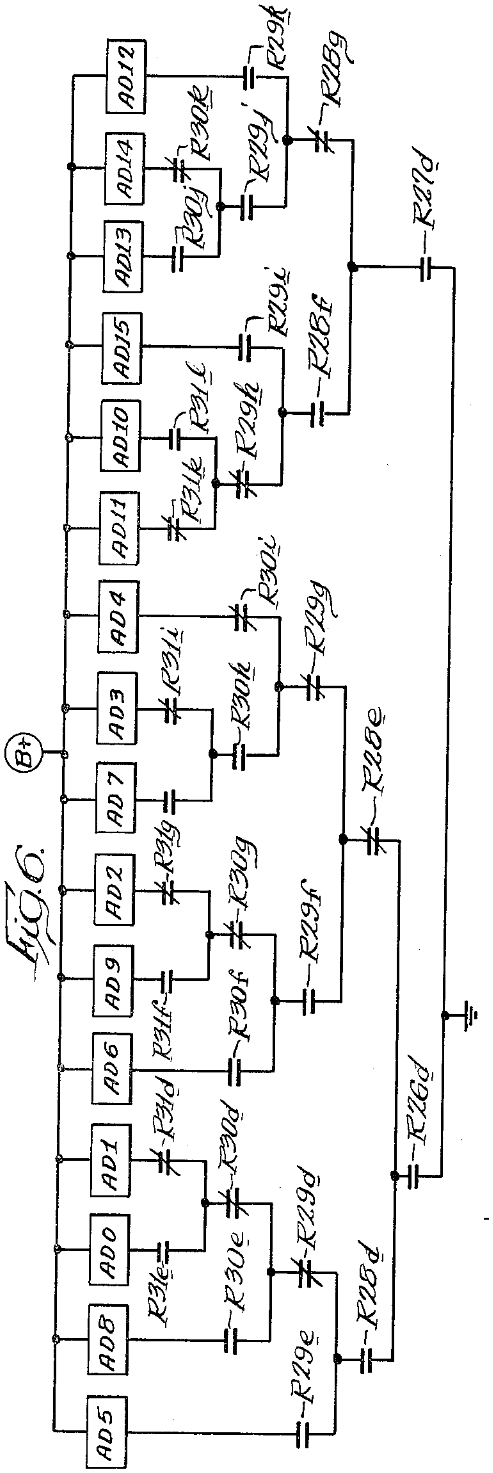
Figure 5B:
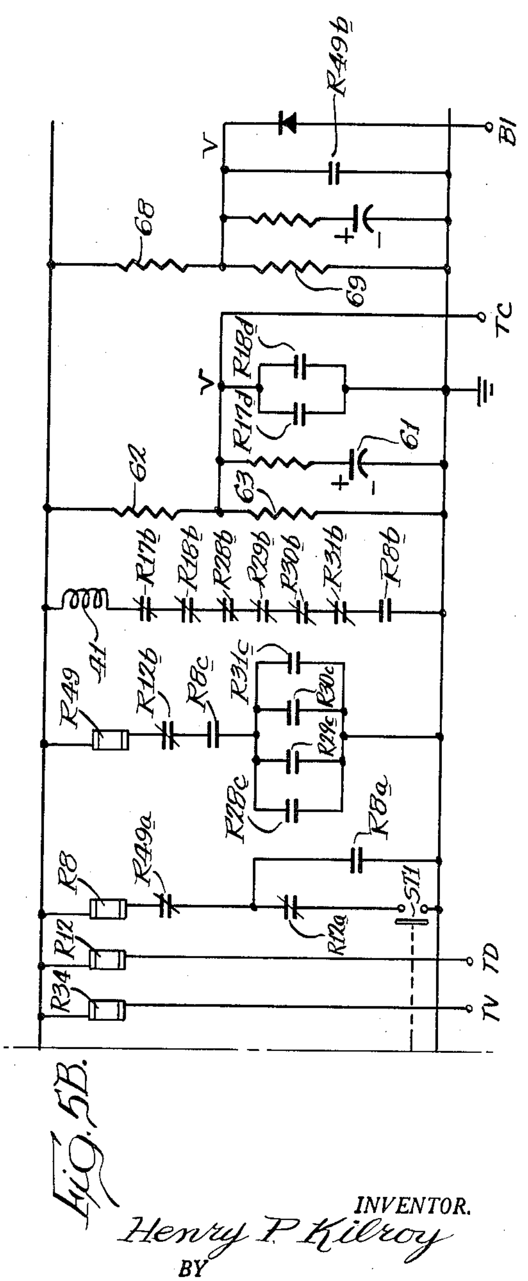

FIGS. 5A and 5B, when joined along the indicated junction line, form a schematic wiring diagram of data input controls; and FIG. 6 is a schematic wiring diagram of a suffix or special code decoder associated with auxiliary devices controlled thereby.

While the invention has been shown and will be described in some detail with reference to a particular embodiment thereof, there is no intention that it thus be limited to such detail. On the contrary, it is intended here to cover all modifications, alternatives, and equivalents falling within the spirit and scope of the invention as defined by the appended claims.

Figure 1:
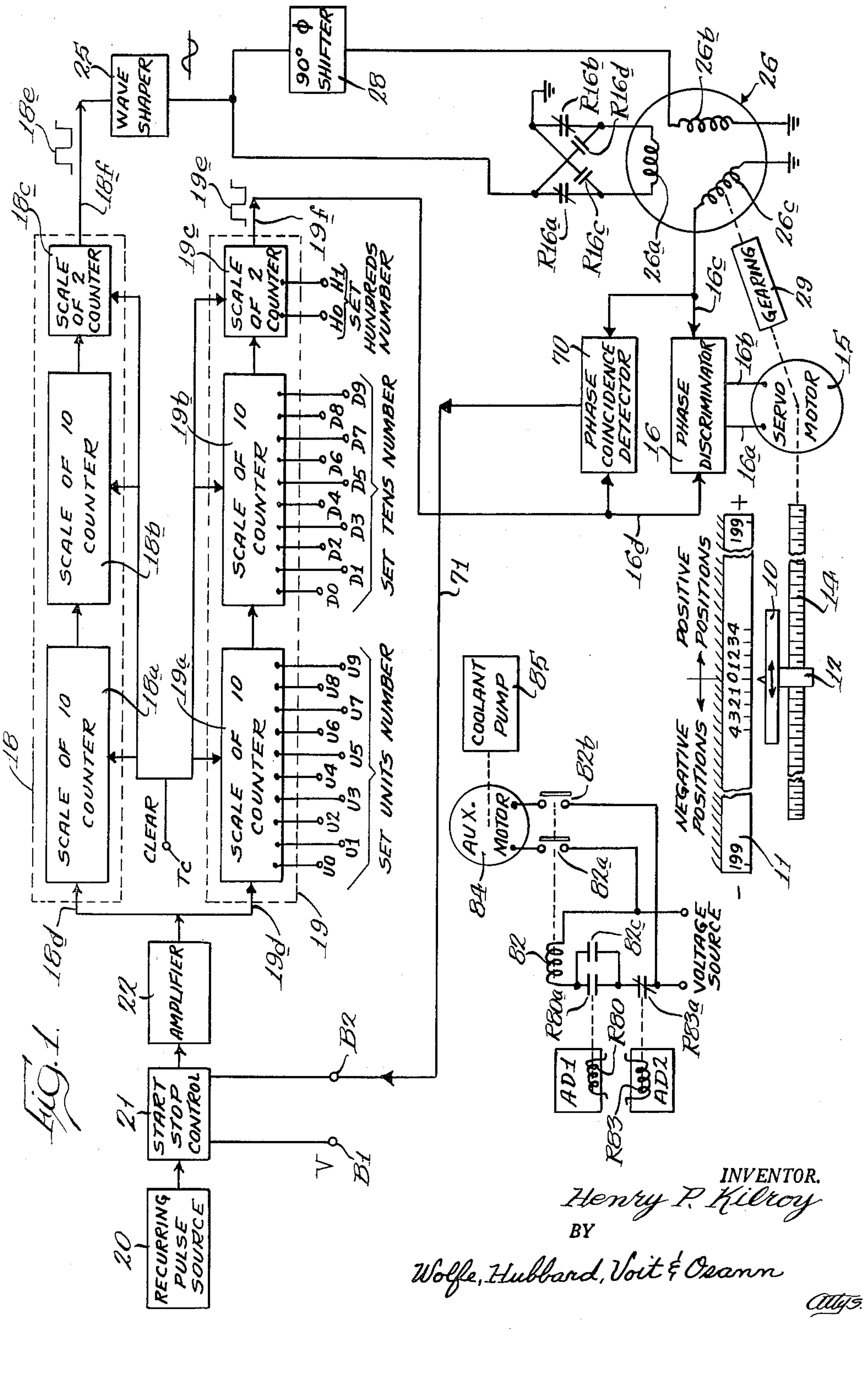
FIGURE 1 is a diagrammatic illustration, partly in block-and-line form, of exemplary storage and decoding devices associated with a condition-controlling servomechanism.

Referring now to FIG. 1, an exemplary condition controlling system is there illustrated in which the specific changeable condition controlled is the position of a movable member 10. This member may, for example, be the work table of a machine tool which is to be successively located at different positions relative to a cutter or drilling spindle. The member or work table 10 is translatable to any of a plurality of positions within a range of +199 to −199 inches as measured along a stationary scale 11. For effecting such movement of the member 10, the latter is fixed to a nut 12 engaged with a lead screw 14 which is rotationally driven by a reversible servomotor 15.

The servomotor 15 is energized to run in one direction of the other by an output or error signal of one polarity or the other appearing on output lines **16*a*, 16*b* of a phase discriminator 16. This discriminator may take any of a variety of forms well known to those skilled in the art, and its specific organization need not be detailed here. In general, the discriminator 16 compares the phase of two recurring waves having the same frequency. The first such recurring wave applied to an input line 16*c* is, by its phase angle, relative to a reference wave, indicative of the actual position of the movable member 10; the second such recurring wave appearing on an input line 16*d* is, by its phase angle relative to a reference wave, indicative of the desired position of the member 10. Such desired position is initially represented by digital data, as will be described below. The phase discriminator 16 thus energizes the motor 15 to drive the member 10 to the left or to the right until the input waves on the lines 16*c* and 16*d*** are in phase agreement, and the error signal of the discriminator is reduced to zero.

To create the recurring waves on the lines **16*c* and 16*d*, a digital-to-analogue decoder which produces a variable phase analogue output is employed in the present instance. Such decoder is here shown as comprising two substantially identical or like scaling chains. The first of these is a reference scaling chain 18 made up of two tandemly connected scale-of-ten counters 18*a*, 18*b* and a scale-of-two counter 18*c*. The second or control scaling chain 19 similarly includes two scale-of-ten counters 19*a*, 19*b* and a scale-of-two counter 19*c*. Assuming that recurring pulses or signals are passed from a source 20 through a start-stop control 21 and an amplifier 22 to input lines 18***d* and 19*d*, the two scaling chains 18 and 19 will both scale by total ratios of two hundred. The output waves 18*e*, 19*e* appearing on output lines 18*f*, 19*f* are thus in the present instance alternating square waves which pass through one complete cycle in response to two hundred input pulses supplied to the input lines 18*d*, 19*d* of the scaling chains 18 and 19.

If the two scaling chains 18 and 19 are both in the same state, i.e., both contain the same "count" such as "0," when the stream of input pulses is initiated, then the output waves 18*e*, 19*e* will not only have the same frequency, but will also be exactly in phase.

For a better understanding of the details of the organization and operation of the phase shift decoder formed by the scaling chains 18 and 19, reference may be made to the copending application of Henry P. Kilroy et al., Serial No. 7,707, filed February 9, 1960 (now U.S. Patent 3,175,138). For present purposes, it need only be understood that the scaling chains 18 and 19 may be "cleared," i.e., both set to the same state or "count" in response to a signal (e.g., a negative-going voltage pulse) passed to a clear terminal TC. It will be assumed for purposes of explanation that a signal on the clear terminal TC sets all of the counters 18*a*, 18*b*, 18*c* and the counters 19*a*, 19*b*, 19*c* to their zero states or counts, i.e., the condition in which they must recieve two hundred pulses to produce one positive-going and one negative-going transition in the output waves 18*e*, 19*e*. If the recurring input pulses supplied to the input lines 18*d*, 19*d* occur at a rate of 80,000 pulses per second, then the two output waves will have a frequency of 400 cycles per second and will be exactly in phase.

To produce a difference in phase between the reference output wave 18*e* and the control 19*e* which in magnitude corresponds to numerical, digital information, provision is made to set the control scaling chain 19 to an initial state or count which corresponds to such numerical information. For this purpose, the counter 19*a* has "setting" terminals U0–U9, the counter 19*b* has setting terminals D0–D9, and the counter 19*c* has setting terminals H0 and H1. By applying a momentary signal (zero volts or ground potential) to one of each of the terminal groups U0–U9, D0–D9 and H0, H1, the scaling chain 19 may be set to a corresponding state or "count," as more fully explained in the aforementioned Kilroy et al. application. For example, if the terminals H1, D2 and U5 are momentarily grounded, the counters 19*c*, 19*b* and 19*a* will be respectively set to the "1," "2," and "5" states, thus being respectively conditioned or placed in the same states which they would have if they respectively received 1, 2 and 5 input pulses after being initially set to the "0" states. The condition or state of the counter 19*c* represents the hundreds digit of a three-place decimal number, while the condition or state of the counter 19*b* represents the tens digit of a three-place decimal number and the state of the counter 19*a* represents the units digit of a three-place number. The signals applied to the terminals H1, D2 and U5 therefore, will set the scaling chain 19 to a count of "125." Thus, only seventy-five input signals need be received on the input terminal 19*b* to produce a negative-going transition in the control waveform 19*e*. Therefore, if the scaling chain 19 is preset to a count of "125" higher than the count set into the reference chain 18, and identical recurring input signals are then supplied to the two scaling chains, the count of the control chain will always be $^{125}/_{200}$ or $5/8$ of a cycle ahead of the reference chain. Thus, the control valve 19*e* will lead the reference wave 18*e* by a phase angle of $5/8 \times 360°$ or 225°.

It will be apparent from the foregoing example that by selectively energizing the "testing" terminals U0–U9, D0–D9, and H0, H1, the control chain 19 may be set to any "count" of 0 through 199, and that the scaling action of the two chains 18 and 19 will thus produce a control waveform 19*e* which leads by any selected multiple of 1.8° between 0 and 358.2° the reference waveform 18*e*. It will also be apparent that once the control chain 19 has been set to a given "count" greater than the count held by the reference chain 18, it will retain that greater count relative to that of the reference chain, thus serving as a means to store or hold digital value signals which are momentarily applied to the terminals U0–U9, D0–D9 and H0, H1. Not only does the decoder formed by the scaling chains 18 and 19 form a storage means for holding numerical information supplied to the setting terminals of the chain 19, but it operates in response to identical recurring pulses supplied to the input lines 18*d*, 19*d* to produce an analogue representation of that numerical information, specifically a phase angle between the control waveform 19*e* and the reference waveform 18*e*, which is proportional to the value of the received numerical information.

Once the control chain 19 has been set to a count corresponding to input data, a start signal is momentarily applied (in a manner to be described) to a terminal B1 and serves to condition the start-stop control 21 so that pulses are passed from the source 20 to the input lines 18*d*, 19*d*. The control and reference waves 19*e*, 18*e* thus are recurring waveforms with the former leading the latter by some phase angle which depends on the numerical setting of the control chain. The reference wave 18*e* is passed through a wave shaping circuit 25 which converts it to sinusoidal form. This sinusoidal reference wave is applied in one sense or the other to one stator winding 26*a* of a two-phase synchronous resolver 26. If relay contacts R16*a*, R16*b* are closed, the excitation of the winding 26*a* is in one sense; if relay contacts 16*c*, 16*d* are closed, the excitation is reversed or switched 180° in phase. The contacts R16*a*, R16*b*, R16*c*, R16*d* are controlled by a relay R16 to govern the sign of the position to which the member 10 is moved, as will be described below. The control waveform 18*e* is also shifted 90° in phase by a phase-shifting device 28 and applied as the excitation voltage to the other stator winding 26*b*. As is well known, the resolver 26 is constructed such that the stator windings 26*a*, 26*b* are physically separated by 90°. Their excitation by voltages separated 90° in phase creates a rotating magnetic field within the stator which induces a sinusoidal voltage in a winding 26*c* carried by a rotor. This rotor is drivingly connected through appropriate speed reduction gearing 29 to the servomotor 15 and the lead screw 14, so that the rotor executes one complete revolution as the movable member 10 traverses its entire range of motion, e.g., from −199 to +199 as measured on the scale 11. The amplitude of the voltage induced in the rotor winding 26*c* is substantially constant, but the phase of the rotor voltage, measured relative to the reference waveform 18*e*, varies as a function of the angular position of the rotor and the linear position of the movable member 10. This voltage induced in the rotor is passed over the input line 16*c* to the phase discriminator 16.

The phase of the control wave 19*e* (relative to the reference waveform 18*e*) depends upon the numerical information previously set into the terminals U0–U9, D0–D9 and H0, H1 and stored by the control scaling chain 19. The phase of this control wave 19*e* thus represents the desired position of the movable member 10. Therefore, the phase angle between the reference wave supplied to the input line 16*d* and the position wave supplied to the input terminal 16*c* represents the error between the desired position and the actual position of the movable member 10. Since the phase discriminator 16 produces an output voltage which is a function of the magnitude of the phase angle between its two inputs, and which is of a polarity corresponding to the sense of that error phase angle, the motor 15 will be energized to drive the member 10 until it reaches the desired position, i.e., until the rotor of the resolver has been turned to a position which makes the recurring waves on the lines 16*c*, 16*d* agree in phase.

Figures 2, 3:
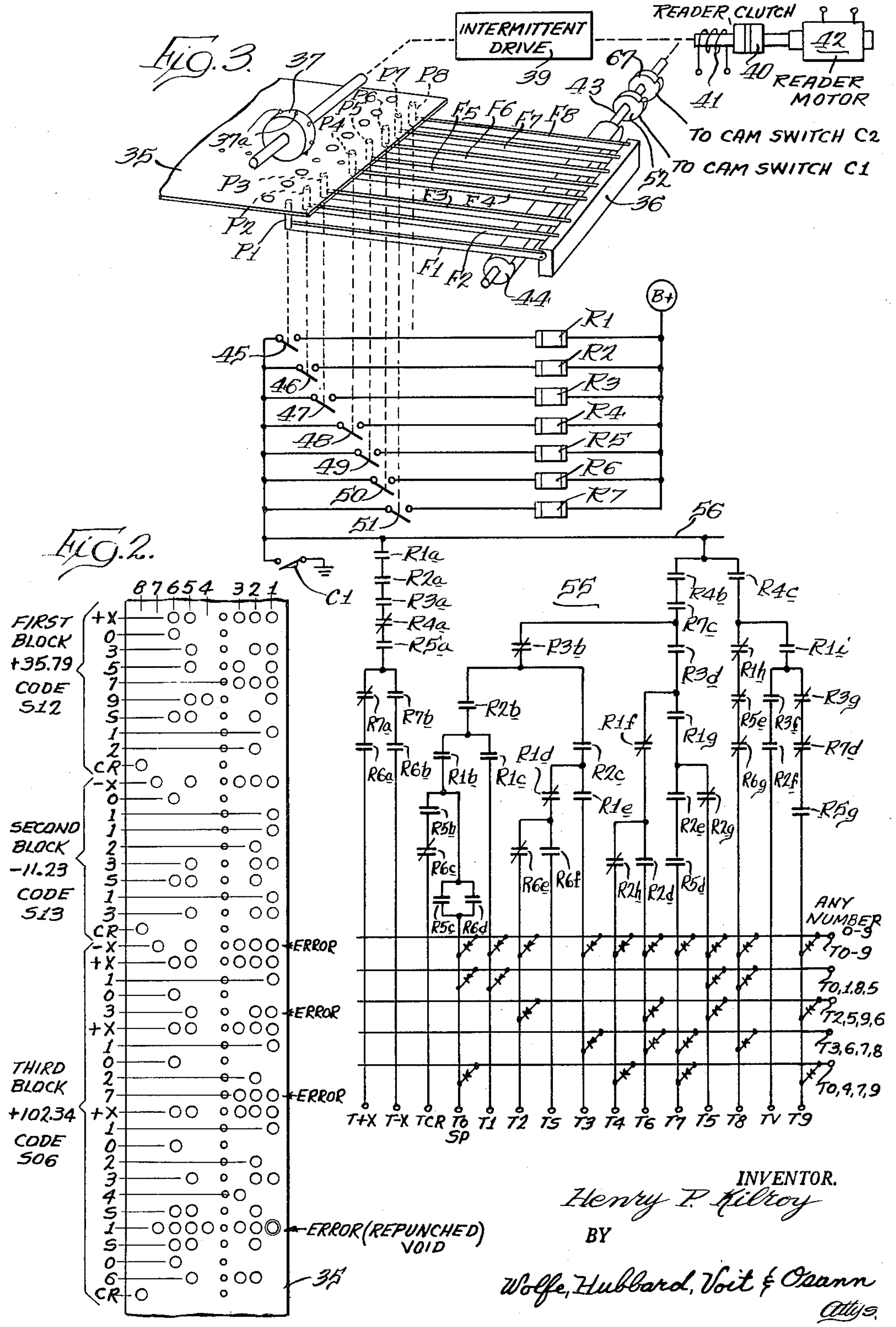
FIG. 2 shows an exemplary record device or punched tape having successive blocks of information digitally represented thereon.
FIG. 3 is a schematic illustration of a punched tape reader and its associated decoder.

The successive positions to which the member 10 is to be moved are initially designated by digital, numerical information carried on a record device, such as a punched tape. A short length of a typical punched tape 35 is shown in FIG. 2. In the exemplary coding system here employed, each transverse row in the tape 35 contains one or more holes in different combinations of eight longitudinal columns, the different combinations of holes representing any one of the characters 0–9, +X, —X, S, CR, or "void." The combinations of columns which receive holes in the punched tape to represent any one of these characters depends upon an arbitrary code which is set forth in the following table:

*Table I*

| Character | Column Number | | | | | | | | |
|---|---|---|---|---|---|---|---|---|---|
| | 8 | 7 | 6 | 5 | 4 | o | 3 | 2 | 1 |
| 0 | ---- | ---- | O | ---- | ---- | o | ---- | ---- | ---- |
| 1 | ---- | ---- | ---- | ---- | ---- | o | ---- | ---- | O |
| 2 | ---- | ---- | ---- | ---- | ---- | o | ---- | O | ---- |
| 3 | ---- | ---- | ---- | O | ---- | o | ---- | O | O |
| 4 | ---- | ---- | ---- | ---- | ---- | o | O | ---- | ---- |
| 5 | ---- | ---- | ---- | O | ---- | o | O | ---- | O |
| 6 | ---- | ---- | ---- | O | ---- | o | O | O | ---- |
| 7 | ---- | ---- | ---- | ---- | ---- | o | O | O | O |
| 8 | ---- | ---- | ---- | ---- | O | o | ---- | ---- | ---- |
| 9 | ---- | ---- | ---- | O | O | o | ---- | ---- | O |
| +X | ---- | ---- | O | O | ---- | o | O | O | O |
| —X | ---- | O | ---- | O | ---- | o | O | O | O |
| S | ---- | ---- | O | O | ---- | o | ---- | O | ---- |
| CR | O | ---- | ---- | ---- | ---- | o | ---- | ---- | ---- |
| VOID | ---- | O | O | O | O | o | O | O | O |

It will be seen from FIG. 2 that the exemplary length of punched tape 35 carries three "blocks" of information which respectively designate three successive positions to which the movable member 10 is to be translated. Each block of information includes successive representations of at least one prefix character (here indicated as a +X or a —X) followed by a plurality of value characters, e.g., any of the decimal numbers 0 through 9. As shown for the first block in the tape 35, there is a transverse row of holes representing the prefix character +X followed by five rows of holes representing the numbers 0, 3, 5, 7 and 9 according to the code shown in Table I above. These latter numbers designate that the movable member 10 is to be positioned at +035.79 inch along the scale 11 (FIG. 1), the plus sign being designated by the prefix character +X. Following the last group of value digits in a block of information on the tape 35 is at least one suffix code, in the present instance a transverse row of holes for the character S followed by two transverse rows of holes for numerical characters. In the first block of the tape 35 the suffix code is being made up by representations of the characters S, 1, 2.

The present system, to be described in detail below, enables the operator (who prepares the punched tape by successively actuating the keys of a conventional tape punching machine according to the successive characters to be represented on the tape) to leave any characters which are erroneously applied to the tape, providing a complete and correct set of position-representing characters is applied subsequently to any error. Suppose the operator desires to represent for the third block of tape 35 a position of +102.34. If he should at the very beginning of the third block erroneously cause a —X to be punched into the tape, that error can simply be disregarded and the correct set of data characters punched thereafter. As shown in the third block of the tape 35, if the operator then types a +X character and the numerical characters 1, 0, 3 into the tape, the 3 represents an error, inasmuch as the desired numbers are 102.34. When this error is made, the operator simply ignores it and begins typing anew the correct set of characters starting with +X and continuing with 1, 0 and 2. The next character punched in the tape is a 7 as shown in FIG. 2. This also constitutes an error, because the number following the 2 which is desired, is a 3. Accordingly, the operator ignores the error and simply types the correct set of characters from the beginning. He types, as shown in FIG. 2, +X followed by 1, 0, 2, 3, 4. This is the correct set of data.

The operator then terminates the third block of information by typing in the suffix code. The code S06 is the desired one for the third block. If he causes an S to be punched followed by the character 1, this constitutes an error. He need only back the tape up one step in the punching apparatus, however, and punch a "void" code over the previously punched error, thus placing a hole in all of the columns 1–7. He then begins typing the suffix code anew, typing S, 0, 6 in that order, followed by the terminal character CR which designates the end of the block. The manner in which the successive blocks of information thus punched into the tape 35 are processed by the control system, including the third block which contains numerous errors, will be made clear below.

To convert the characters, represented by an arbitrary code of punched holes in the successive lines of the punched tape 35, into electrical signals which represent the different respective characters, a reader and decoder of the type diagrammatically illustrated in FIG. 3 is employed. Such reader includes a plurality of resilient fingers F1–F8 which are anchored to a support block 36 and carry at their free ends corresponding feeler pins P1–P8. These fingers are spaced to be aligned with the eight longitudinal columns of the punched tape 35 and the latter is intermittently stepped longitudinally past the fingers so that the successive rows of punched holes in the tape are sequentially aligned with the pins. The tape feeding action is produced by a sprocket 37 having teeth 37*a* engageable with a row of sprocket holes, one for each transverse row of punched holes, which extends longitudinally of the tape 35. The feeding sprocket 37 is stepped by an intermittent drive device 39 which is driven through an electromagnetic clutch 40 having an actuating coil 41 from a reader motor 42. It may be assumed that the motor 42 is continuously energized.

After the sprocket 37 has advanced the tape 35 to align a row of punched holes therein with the feeler pins P1–P8, a cam 44 disposed on a rotatable shaft 43 driven from the motor 42 and the clutch 40 urges all of the fingers F1–F8 upwardly. Any of the pins P1–P8 which finds a hole in the corresponding column of the tape 35 will thus project through such hole and be elevated, while the pins which find no hole aligned therewith will not be appreciably elevated. The feeler pins P1–P8 are mechanically connected as indicated in FIG. 3 to actuate respective normally open switches 45–51. A second cam 52 disposed on the shaft 43 is shaped to momentarily close a cam switch C1 after the cam 44 has urged the fingers F1–F8 upwardly. When the cam switch C1 momentarily closes after a certain combination of the switches 45–51 have been closed according to the combination of holes appearing in a given row of the punched tape 35, an energization path is created from a voltage source here conventionally shown by the symbol B+ through those closed switches and a corresponding combination of relays R1–R7. Thus, the relays R1–R7 will be energized in a certain combination for each transverse row of holes read from the punched tape 35, the particular combination of relays which is energized corresponding to the combination of holes in the punched tape which represents any given character. The relays R1–R7 each have a plurality of contacts which are designated in FIG. 3 by the same reference character to which is added a distinguishing lower-case alphabetical suffix. Thus, the relay R1 has normally open contacts R1*a* through R1*i* as shown in FIG. 3. These multiple contacts controlled by the relays R1–R7 are connected to form a decoding network 55 which results in a particular one of a plurality of output terminals (T+X, T—X, T0–T9 and TV the latter corresponding to the "void" character) being placed momentarily at ground potential. Each of these output terminals leads through a combination of contacts controlled by the relays R1–R7 to a conductor 56 which is placed at ground potential whenever the cam switch C1 is closed. Thus, whenever each line of the punched tape 35 is read and the cam switch C1 is momentarily closed, the relay contacts in the decoding circuit 55 will close in combinations to place the output terminal corresponding to the character represented by the row of punched holes on the tape at ground potential. For example, inspection of the relay contacts associated with the several output terminals of the decoding circuit of FIG. 3 will show that when the character 3 is read from the punched tape, the pins P1, P2 and P5 will be elevated to close the switches 45, 46 and 49, thereby energizing the relays R1, R2 and R5. With the contacts of these relays actuated and the cam switch C1 closed, a complete circuit will be established from ground through the conductor 56 through normally closed contacts R4*b*, R7*c* and R3*b* as well as normally open contacts R2*c* and R1*e* to the output terminal T3. The output terminal T3 will thus be momentarily placed at ground potential, but inspection will show that none of the other output terminals will be connected to the conductor 56 when only R1, R2 and R5 out of the seven relays R1–R7 are actuated. Without further detailed explanation, it will be apparent from inspection of FIG. 3 that whenever any row of punched holes in the tape 35 is read by the feeler pins P1–P8, then the output terminal corresponding to the particular character represented by that row of punched holes will be momentarily placed at ground potential.

For a purpose to be made clear below, it is desirable to complete a conduction path to ground from additional terminals whenever any one of particular combinations of characters is read from the tape 35. For example, as shown in FIG. 3 a terminal T0–9 is connected by unidirectionally conductive diodes to each of the terminals T0 through T9, and will thus be placed momentarily at ground potential whenever any one of the numerical characters 0 through 9 is read from the punched tape. The diodes perform a circuit isolating function which will become apparent as the description proceeds. Secondly, terminal T0, 1, 8, 5 shown in FIG. 3 will be momentarily placed at ground potential when any of the characters 0, 1, 8 or 5 is read from the punched tape. The terminal T5, 2, 9, 6 will be grounded momentarily when any of the characters 5, 2, 9 or 6 is read. The terminal T3, 6, 7, 8 will be momentarily grounded when any of the indicated numerical characters is read. Finally, a terminal T0, 4, 7, 9 will be momentarily placed at ground potential whenever any of those indicated numerical characters are read.

Figure 4:
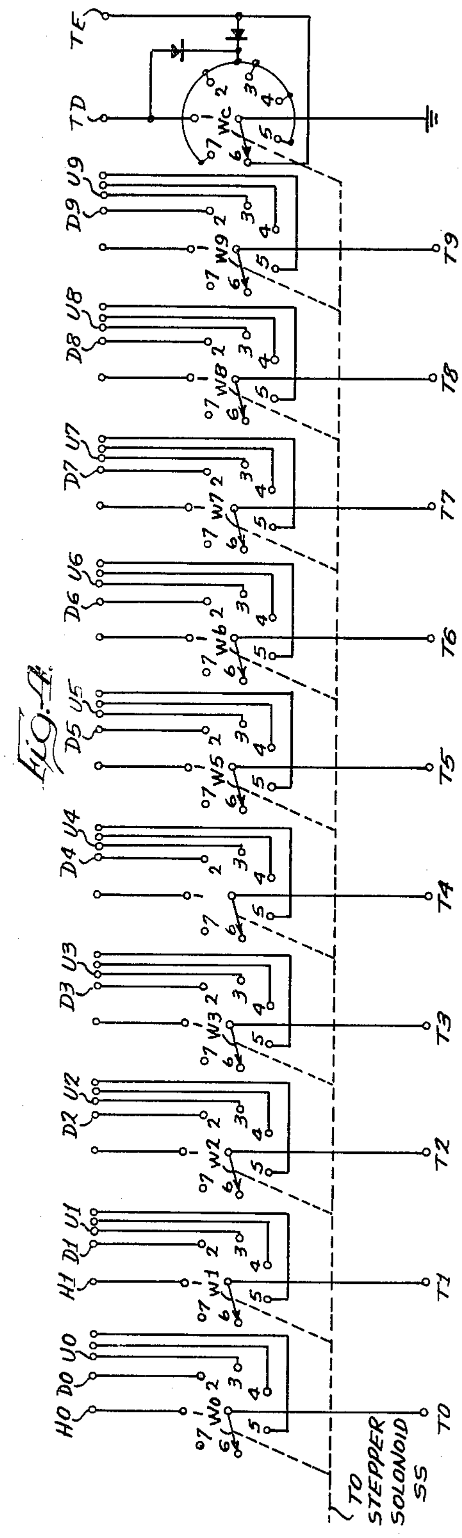
FIG. 4 is a schematic representation of a multi-level stepping switch employed as a data distributor.

For the purpose of selectively momentarily grounding the terminals U0–U9, D0–D9 and H0, H1 (FIG. 1), a multi-level stepping switch is employed as a data distributor. This stepping switch includes eleven rotatable wipers W0–W9 and W*c*, each adapted to successively engage seven associated contact points which are numbered as indicated in FIG. 4. The wipers W0–W9 and W*c* are stepped from one contact point to the next in a clockwise direction in response to energization followed by deenergization of a stepping solenoid SS. The wipers W0–W9 are respectively connected as indicated in FIG. 4 to the decimal character output terminals T0–T9 which appear in FIG. 3. Thus, whenever the decimal character 3 is read from the punched tape 35, the terminal T3 and the wiper W3 will be momentarily placed at ground potential.

The stationary contact points 1, 2, 3 associated with the wiper W0 may be considered as the hundreds, tens and units points for the character 0. These first, second and third contact points are connected as shown in FIG. 4 to terminals H0, D0 and U0 which correspond to the same terminals appearing in FIG. 1. Similarly, the contact points 1, 2, 3 associated with the wiper W1 are connected to the terminals H1, D1 and U1, respectively in FIG. 1. The second and third terminals associated with the wiper W2 are connected to the terminals D1 and U2 in FIG. 1. It will likewise be apparent from the foregoing examples that the second and third contact points of the wipers W3 through W9 connect to the correspondingly numbered terminals D3–D9 and U3–U9 in FIG. 1. The manner in which the stepping switch illustrated in FIG. 3 functions to "set" the control scaling chain 19 of FIG. 1 to a "count" which corresponds to a three-digit decimal number read from the punched tape 35 will become clear as the description proceeds.

In accordance with the present invention, the output of the tape reader and decoder (FIG. 3) is accepted by control circuits which cause the storage device or scaling chain 19 (FIG. 1) to be "cleared and set" to the same state as the reference scaling chain 18 in response to the reading of a prefix character (+X or —X). The storage device is then "set" or conditioned according to successive reader signals representing value digits (0–9) in the hundreds, tens and units orders appearing subsequently to a prefix character, but the operation of the normally inactive phase-shift decoder and servomechanism is not started. Only when a complete suffix code (S followed by two numerical characters) is received from the punched tape is the operation of the scaling chains 18 and 19, the discriminator 16 and the servomotor 15 initiated to change the controlled condition, i.e., to translate the movable member 10 to a position defined by the previously received and stored value digits. If two prefix characters and sets of value digits are received from one block of the tape 35 before a suffix code, the second prefix character causes the first set of value digits to be cleared or destroyed from storage, so that only the second set of value digits governs the positioning of the member 10. The first set of value characters or signals, which may contain an error, is simply ignored.

The preferred control apparatus for effecting these results may best be described by a narration of the sequence of operations which occur when one block of characters is read from the punched tape 35. In the drawings and in the following description, each of the control relays is designated by a different number having the prefix "R," while all of the contacts controlled by a given control relay are identified by the same reference character to which a distinguishing alphabetical suffix is added. For example, a relay may be designated as relay R17, and contacts carrying the reference designations R17*a*, R17*b*, R17*c*, etc. are actuated when the relay R17 is energized.

Assume first that the reader clutch coil 41 (FIGS. 3 and 5) is deenergized and that the clutch 40 is disengaged, so that the punched tape 35 is stationary with the feeler pins P1–P8 aligned with the last row of holes (representing the character CR) in the preceding block of the tape. Assume further that the stepping switch wipers W0–W9, W*c* are all engaged with their 6 contact points, having reached that location as a result of the distribution of value signals from the preceding block of information read from the tape. Under this initial condition, with the control wiper W*c* engaged with its 6 contact point, the control terminal TD will not be grounded, but as shown in FIG. 4, that terminal will be grounded when the wiper W*c* is engaged with any of its contact points 1–5 or 7. The control terminal TD leads through a relay R12 (FIG. 5B) to a point of positive potential here represented conventionally by the symbol B+, so that the relay R12 will be deenergized when the wiper W*c* is in the 6 position, and energized when the wiper W*c* is in any other position. Finally, the start-stop control 21 (FIG. 1) is initially "closed" i.e., conditioned so that no input pulses are being passed from the source 21 to the scaling chain input lines 18*d*, 19*d*.

To position the member 10 according to the data in the next block of the tape 35, the operator need only momentarily actuate a start switch having normally open contacts ST1 (FIG. 5B). Closure of these contacts completes an energization path from the positive B+ voltage to ground through a relay R8, normally closed contacts R49*a* and normally closed contacts R12*a*. Relay R8 is thus picked up and sealed in through its own normally open contacts R8*a* and the contacts R49*a*.

Pick-up of the relay R8 closes its contacts R8*b* in series with the tape reader clutch coil 41 to complete an energization path through normally closed contacts R17*b*, R18*b*, R2*b*, R29*b*, R30*b*, and R31*b*. The reader clutch 40 is thus engaged so that the tape 35 is advanced (FIG. 3). As soon as the tape advances one line, the feeler pins P1–P8 will sense and read the first or prefix character of the next block of information. This prefix character will be either a +X or a —X. Assuming that it is a +X, the terminal T+X (FIG. 3) will be momentarily grounded.

Momentary grounding of the terminal T+X will result in energization of a relay R17 (FIG. 5A) and closure of its contacts R17*a* which lead through an insolating diode 60 to the control terminal TE. As shown in FIG. 4, the terminal TE is connected to the contact points 2–7 associated with the wiper W*c* so that it will be grounded whenever that wiper is in any position except engaged with the 1 contact. Thus, the relay R17 will be sealed in through its own contacts R17*a* until such time that the stepping switch wiper W*c* reaches its 1 contact point.

Immediately upon energization of the relay R17 in response to reading of the character +X, its normally closed contacts R17*b* in series with the clutch coil 41 open to stop the tape reader shown in FIG. 3. The tape 35 is thus brought to a halt with the feeler pins P1–P8 aligned with the second row of holes in the block of information.

Pick-up of the relay R17 also opens its normally closed contacts R17*c* (FIG. 5A) to assure that a relay R16 is not simultaneously energized. The purpose of the relay R16 will be made clear below.

Additionally, pick-up of the relay R17 results in closure of its normally open contacts R17*d* (FIG. 5B) resulting in discharge of a capacitor 61 connected to the junction of voltage-dividing resistors 62 and 63 connected between the point of positive potential and ground. As a result of this closure of the contacts R17*d*, a negative-going voltage pulse appears on the clear terminal TC in FIG. 5, this terminal being connected to the terminal TC in FIG. 1. The negative-going pulse results in clearing of the scaling chains 18, 19 and resetting of the counters therein to the zero states. Thus, in response to the reading of the prefix character +X, the scaling chains 18 and 19 are both cleared and set to the identical state, specifically, the zero state.

Finally, pick-up of the relay R17 closes its normally open contacts R17*e* (FIG. 5A) to complete a circuit from the B+ voltage source through the stepping solenoid SS, the stepping switch interrupter contacts INT and an isolating diode 65 to the control terminal TE. As previously noted, the control terminal TE is placed at ground potential through the wiper W*c*when the latter is in any position except engaged with its 1 contact point. Therefore, closure of the contacts R17*e* will complete an energization circuit for the stepping solenoid SS, causing the interrupter contacts INT to be opened. The stepping solenoid SS is thus deenergized shortly after it is energized and causes the wipers W0–W9 and W*c* to advance to their next contact point, specifically the 7 contact point. Upon the wipers reaching the 7 contact point, the interrupter contacts INT reclose so that the solenoid SS is again energized. The interrupter contacts INT again open so that the solenoid SS is deenergized and the wipers are stepped to the 1 contact point. When the wiper W*c* reaches the 1 contact point, the terminal TE is disconnected from ground, thereby interrupting the circuit through the contacts R17*e* so that the stepping switch SS is not energized. Moreover, disconnection of the terminal TE from ground when the wiper W*c* reaches its 1 position deenergizes the relay R17, so that the latter is deactuated and the contacts R17*e* open. The contacts 17*b* reclose so that the clutch coil 41 is again energized and the tape reader started.

With the stepping switch wipers in their 1 positions, and with the feeler pins P1–P8 reading the second line of a block of information on the punched tape 35 as the cam switch C1 closes, the relay R35 (FIG. 5A) will be energized since it leads from the point of positive voltage B+ to the terminal T0–9 (FIG. 3) which is placed at ground potential momentarily whenever any numerical character 0 through 9 is being read. Thus, as soon as the tape reader is restarted by closure of the contacts R17*b*, the relay R35 is energized and its contacts R35*a* are closed. This results in energization of the stepping switch solenoid SS through the contacts R35*a* and normally closed contacts R25*a*, R26*a* and R27*a*. When the cam switch C1 reopens, the relay 35 is dropped out to open the contacts R35*a* and deenergize the stepping solenoid SS. The wipers W0–W9, W*c* are in response stepped to their 2 contact points just before the reader reads the third row of holes in the block on the tape 35. With the wipers on their 2 contact points, the response of the tape reader to the third row of holes in the block will place one of the numerical terminals T0–T9 at ground potential, and will also momentarily place the terminal T0–9 at ground potential. Thus, the relay R35 will be reenergized, the contacts R35*a* reclosed to energize the solenoid SS; the relay R35 is then deenergized and its contacts R35*a* reopened as the tape is advanced to read the fourth row of holes therein. Thus, it will be apparent that the relay R35 closes and opens its contacts R35*a* to energize and deenergize the solenoid SS and step the wipers W0–W9, W*c* successively from the contact point 1 to the contact point 6 as five successive rows of holes are read from the punched tape. These five successive rows of holes may represent numerical value digits which designate the new position to which the member 10 (FIG. 1) is to be translated.

As the stepping switch wipers move successively from their contact points 1 to their contact points 6 in response to reading of five rows of holes representing numerical value digits on the punched tape, the wipers W0–9 distribute the numerical signals appearing on the terminals T0–T9 to the corresponding "setting" terminals of the control scaling chain 19 (FIG. 1). The first numerical value digit read after the prefix character +X will be a "1" or a "0." Accordingly, when the wipers W0 and W1 are engaged with their 1 contact points, one of the terminals H0 or H1 will be momentarily placed at ground potential, thus setting the scale-of-two counter 19*c* to either the "0" or "1" state. When the stepping switch wipers are in their 2 positions, one of the terminals T0–T9 will be momentarily placed at ground potential, and this ground potential will be routed through the corresponding wiper W0–W9 to the corresponding one of the terminals D0–D9. Thus, if the "tens order" number in a set of value characters is a 3, the terminal D3 will be momentarily placed at ground potential, setting the scale-of-ten counter 19*b* in FIG. 1 to the 3 state. As the wipers W0–W9 advance to their 3 contact points, one of the terminals T0–T9 will be momentarily placed at ground potential. This ground potential will be passed through the corresponding one of the wipers W0–W9 to the corresponding one of the terminals U0–U9, to set the scale-of-ten counter 19*a* to the corresponding state. For example, if the value of the units character in a set of numerical digits read from the punched tape after a prefix character +X is 4, then the wiper W4 will be placed momentarily at ground potential when it is engaged with its 3 contact point, thus grounding the terminal U4 and setting the counter 19*a* (FIG. 1) to the 4 state.

Therefore, after a prefix character, such as +X is read from the punched tape, the stepping switch solenoid SS is successively energized and deenergized to step the wipers W0–W9, W*c* from position 1 to position 6. As the wipers pass through their successive positions, they will transfer or distribute signals appearing on the terminals T0–T9 to the corresponding terminals of the hundreds, tens and units storage elements 19*c*, 19*b* and 19*a* in the control scaling chain 19. Thus, the scaling chain 19 will be set to a state or count which is different from the state or count of the reference chain 18 by an amount which corresponds to the set of numerical value digits read from the punched tape 35.

In FIG. 3, it has been assumed that a set of value digits following a prefix character in one block of the tape 35 includes five rows of holes, thus representing a five-place decimal number. However, the scaling chain 19 shown in FIG. 1 is for purposes of simplification shown only as a storage device which is settable in accordance with a three-digit decimal number. It will be understood by those skilled in the art that the scaling chain 19 may be readily modified, or that coarse and fine scaling chains may be employed, to accept a five-digit number rather than a three-digit number. For purposes of the present explanation, it need only be understood that as the stepping switch wipers W0–W9, W*c* engage their contact points 1, 2 and 3, the counters 19*c*, 19*b* and 19*a* are set in accordance with the numerical characters represented by signals appearing on the terminals T0–T9, thus setting the scaling chain 19 to a three-digit decimal number which corresponds to the three decimal numbers represented on the punched tape by the three rows of holes following a prefix character.

When the stepping switch wipers reach their 6 contact points, the terminal TD is disconnected from ground by the wiper W*c*, so that the relay R12 is deenergized and its normally closed contacts R12*b* reclose to prepare an energization circuit for relay R49 (FIG. 5B). The contacts R12*a* also reclose so that another cycle of operation can later be initiated by closure of the start switch contacts ST1.

When the stepping switch wipers reach their 6 contact points, the clutch coil 41 of the tape reader remains energized so that the tape reader next senses a suffix code group in the block of information on the punched tape 35. Thus, the next response of the tape reader is momentary grounding of the terminal TS, i.e., reading of the row of holes representing the character S. The relay R35 connected to the terminal T0–9 is thus not energized and the stepping switch solenoid SS is not energized or deenergized when the character S is read. Accordingly, the wipers W0–W9, W*c* remain stationary and engaged with their 6 contact points.

When the terminal TS is momentarily grounded in response to reading of an S character from the tape, a relay R25 (FIG. 5A) is energized by current flow from the voltage source B+ through normally closed contacts R34*a*. The relay R25 is thus energized and sealed in through its own normally open contacts R25*b* in series with normally closed contacts R26*b*, R27*b*. Pick-up of the relay R25 also closes its normally open contacts R25*c* to prepare an energization circuit for the relays R26 through R31. The latter relays were previously made non-responsive to numerical characters read from the punched tape 35 due to the contacts R25*c* being open. Pick-up of the relay R25 further opens its normally closed contacts R25*a*, so that the stepping solenoid SS will not be energized when the relay R35 picks up and its contacts R35*a* close in response to the next numerical character read from the punched tape.

After the first S character is a suffix code group has been read from the punched tape, the tape is advanced to read the first digit or row of holes following that S character. This next row of holes will represent either of the decimal numbers 0 or 1. If the numerical character following an S character is 0 or 1, an energization path will be created to pick-up either the relay R26 or the relay R27 (FIG. 5A). The pick-up circuit for the relay R26 includes normally closed contacts R27*c*, while the pick-up circuit for the relay R27 includes normally closed contacts R26*c*, thus assuring that once one of these relays is energized, the other cannot be actuated. Assuming that the first character after the S read from the punched tape is a 0, the relay R26 will be energized by current flow through contacts R34*a*, R25*c*, the relay coil R26, and normally closed contacts R27*c* to the terminal T0. The relay R26 is sealed in through its contacts R26*d* and normally closed start switch contacts ST2. Pick-up of the relay R26 results in opening of the contacts R26*a* so that the stepping switch solenoid SS cannot be energized even though the contacts R25*a* subsequently reclose. Moreover, pick-up of the relay R26 opens the contacts R26*b* to drop-out the relay R25. The contacts R26*b*, R27*b* are paralleled by a cam switch C2 closed by a cam 67 (FIG. 1) on the shaft 45 during the reading of each character so that the relay contacts R25*c* do not open until after relay contacts R26*e* close. This assures that there is an energization and sealing circuit for the relay R26 before relay R25 drops out in response to reading of a first character following an S on the tape 35. Summarized, reading of a first row of holes following an S character from the punched tape 35 results in drop-out of the relay R25 while either the relay R26 or R27 is picked up and sealed in. If that first row of holes following an S character is a decimal 0, the relay R26 is picked up and sealed in, while the relay R27 is left deenergized. Conversely, if a 1 is read, the relay R27 is picked up, and the relay R26 left deenergized.

When the tape 35 is advanced to read the second row of holes following an S character on the tape 35, the character may be any decimal number 0 through 9. Accordingly, one of the terminals T0–T9 in FIG. 3 will be momentarily placed at ground potential. Thus, one or more of the terminals T0, 1, 8, 5; T5, 2, 9, 6; T3, 6, 7, 8; or T0, 4, 7, 9 will be momentarily placed at ground potential and will result in one or more of the relays R28 through R31 being energized. Any one of the relays R28 through R31 which is energized will be sealed in through its normally open contacts R28*a*, R29*a*, R30*a*, or R31*a* and the normally closed start switch contacts ST2. Assuming that the second digit following an S on the tape 35 is a 3, then the terminal T3, 6, 7, 8 will be momentarily grounded and the relay R30 will be energized and sealed in through its contacts R30*a*.

Pick-up of any of the relays R28 through R31 in response to reading of the second digit following an S character, causes one of the normally closed contacts R28*b*, R29*b*, R30*b* or R31*b* in series with the clutch coil 41 (FIG. 5B) will be opened to deenergize the clutch coil, disengage the clutch 40 and terminate operation of the tape reader. The tape 35 is halted with the feeler pins P1–P8 aligned with the last row of holes (representing the terminal character CR) in the block.

The relays R28–R31 have normally open contacts R28*c*, R29*c*, R30*c*, R31*c* connected in parallel, and the group connected in series with relay contacts R12*b* and R8*c* to control the relay R49. Thus, whenever any second digit after an S character is read from the punched tape to signify a complete suffix code, the relay R49 will be energized momentarily since the relay contacts R8*c* were previously closed as a result of the relay R8 being sealed in, and the relay contacts R12*b* are closed as a result of the relay R12 being deenergized when the control wiper Wc is engaged with its 6 contact point.

Energization of the relay R49 opens its contacts R49*a* to drop out the relay R8. Also, energization of the relay R49 results in momentary closure of the contacts R49*b* to place the terminal B1 at ground potential. The terminal B1 is connected to the junction of voltage-dividing resistors 68 and 69 connected between the B+ source and ground, and thus is held at a positive potential except when the contacts R49*b* are closed. Closures of the contacts R49*b*, therefore, produces a negative-going voltage pulse on the terminal B1 (FIG. 5) to turn "on" the start-stop control 21 in FIG. 1. Recurring pulses begin to pass from the source 20 through the control 21 and the amplifier 22 to the scaling chain input lines 18*d* and 19*d*. The scaling chains 18 and 19, therefore, begin producing recurring output waves 18*e* and 19*e*. That is, the complete reading of a suffix code and momentary pick-up of the relay R49 initiates the operation of the phase-shift decoder 18, 19 and the servomechanism previously described in connection with FIG. 1.

Since the recurring reference wave 18*e* and the recurring control wave 19*e* are displaced in phase by an angle which depends upon the three-digit decimal number previously set into and stored by the scaling chain 19, the synchro resolver 26 produces an alternating wave on the line 16*c* which is by its phase representative of the actual position of the movable member 10. The recurring control wave 19*a* is passed over the line 16*d* to the phase discriminator 16 which produces on its output lines 16*a*, 16*b* a D.C. voltage which is proportional in magnitude to and agreeable in polarity with the extent and sense of the position error of the member 10. Accordingly, the motor 15 is energized to rotate the lead screw 14 and drive the member 10 to the left or to the right until it reaches the new position designated by the numbers previously set into the scaling chain 19.

When the member 10 reaches the new position designated by the numbers set into the scaling chain 19, the recurring waves on the lines 16*c* and 16*d* will be in phase agreement, i.e., have a predetermined phase separation such as 0° or 180°. These signals are also passed through a phase coincidence detector 70 (FIG. 1) which produces an output signal on the line 71 in response to phase agreement of the recurring waves on the lines 16*c* and 16*d*. This signal, indicating that the member 10 has been moved to the desired position, is passed to a stop terminal B2 to turn the start-stop control 21 "off" so that input pulses no longer reach the input lines 18*d* and 19*d* of the scaling chains 18 and 19. The movable member 10 has thus been moved to the position designated by numerical information set into the scaling chain 19, and the start-stop control 21 turned "off" to disable the normally inactive phase-shift decoder and servomechanism. The system is now ready to repeat another positioning cycle. The operator need only momentarily depress the start switch, thus reclosing the contacts ST1 to initiate a second cycle of operation similar to that just described. Actuation of the start switch also momentarily opens the contacts ST2 (FIG. 5) so that those ones of the relays R26 through R31 previously sealed in will be deenergized and made ready to receive a new set of suffix code signals.

In the exemplary operational cycle just described, it was assumed that the prefix character represented by the first line of the block in the punched tape 35 was a +X. This +X character designated the sign of the position to which the member 10 was to be moved along the scale 11 in FIG. 1. It resulted in initial energization of the relay R17, and opening of the normally closed contacts R17*c* (FIG. 5A) to assure that the relay R16 was deenergized. Accordingly, when the scaling chains 18 and 19 begin their operation, the alternating waveform 18*e*, after reshaping in the wave shaper 25, was passed through the normally closed contacts R16*a* and R16*b* to excite the resolver stator winding 26*a*. The sense of excitation of the stator winding 26*a*, therefore, resulted in the position-representing waveform induced in the rotor 26 and supplied to the line 16*c* having a phase which caused the movable member 10 to move to a numerical position on the right half of the scale 11 corresponding to the numbers set into the counter 19. In other words, if the numbers "123" are set into the counter 19 following a +X prefix character, the member 10 is moved to the positive side of the scale 11 and to the position corresponding to "123."

On the other hand, if the prefix character read from the first line of a block in the punched tape 35 is a —X, instead of a +X, then the relay R17 in FIG. 5A will not be energized. Rather, the terminal T—X will be momentarily grounded so that the relay R18 is picked up and sealed in through its normally open contacts R18*a*. Pick-up of the relay R18 closes its contacts R18*f* to create an energization path through a relay R16 and the normally closed contacts R17*c*. When the relay R16 picks up, its contacts R16*e* close to hold it energized even though the contacts R18*f* subsequently open. Pick-up of the relay R16 opens normally closed contacts R16*f* to break one of the sealing circuits for the relay R18. However, the relay R18 remains sealed in through its contacts R18*a* and an isolating diode 72 leading to the control terminal TE until the control wiper Wc steps to its 1 contact point and the terminal TE is disconnected from ground.

Under these circumstances, the relay R18 performs all of the functions previously described above for the relay R17. That is, when the relay R18 picks up, its normally closed contacts R18*b* close to complete an energization circuit for the clutch coil 41 and thus to start the tape reader. Secondly, when the relay R18 picks up, its contacts R18*d*, in parallel with the contacts R17*b*, close to create a negative-going pulse on the terminal TC which clears the scaling chains 18 and 19 and sets them both in the same state, e.g., zero count. Moreover, when the relay R18 picks up, its contacts R18*e*, in parallel with the contacts R17*e*, close to create an energization circuit for the stepping switch solenoid SS through the terminal TE and the control wiper Wc. The solenoid is thus actuated to step its wipers around to their 1 contact points, that is, until the terminal TE is disconnected from ground by the wiper Wc. Thus, the cycle of operation when movement of the member 10 is to be to a negative position along the scale 11 is the same as that described above, with the relay R18 serving the functions of the relay R17.

However, when a —X prefix character is read from the tape and the relay R18 is energized, the relay R16 will be energized and sealed in. Thus, the contacts R16*a* and R16*b* in FIG. 1 will be opened and the contacts R16*c* and R16*d* will be closed, thereby reversing the sense with which the stator winding 26*a* is energized. In effect, the phase of the A.C. excitation applied to the winding 26*a* is reversed by 180° so that a different phase angle is obtained for the position signal which appears on the line 16*c*. Accordingly, the output of the discriminator 16 and the rotation of the motor 15 have a polarity and sense to move the member 10 to the negative side of the scale 11 and to a position designated by the numbers previously set into the scaling chain 19. This sign control system and the manner in which it operates is more fully described and claimed in the copending application of Henry P. Kilroy et al., Serial No. 7,577; filed February 8, 1960 (now U.S. Patent 3,078,400), and to which reference may be made for further details.

In the simplified, exemplary system here described, the position of the member 10 called for by one set of numbers cannot be displaced more than 99 inches from the previous position of the movable member. That is, the change in position designated by one block of information should not exceed 99 inches; otherwise, the phase discriminator 16 will produce an output signal of the wrong polarity and the motor 15 will drive the member 10 in the wrong direction. The limitation is readily eliminated by providing both coarse and fine channels, as is well known, or by the programmer effecting movements greater than 99 inches with two blocks on the tape 35.

Assume now that the tape reader reads a block of information, such as the third block illustrated on the tape 35 in FIG. 2, which contains a number of errors or lines which do not properly designate the position to which the member 10 is to be moved. Referring to the first line of the third block in FIG. 2, the character there represented is a −X, and constitutes an error since it is desired to move the member 10 to a position of +102.34 along the scale 11. In response to reading of the −X line of the third block, the relays R18 and R16 will be energized. However, as soon as the next line, representing a +X is read from the tape, the relay R17 will be energized and the contacts R17*c* will be opened to drop out the relay R16. Thereafter, the relays R17 and R18 will both be energized until the control wiper *Wc* reaches the 1 position and the control terminal TE is disconnected from ground. With this, both the relays R17 and R18 will be deenergized and the relay R16 will be left deenergized so that the first erroneous line representing −X in the third block of FIG. 2 is effectively disregarded.

When the characters 1, 0, 3 represented by the next three lines in the third block of FIG. 2 are read, the last line represents an error since the third digit of the desired numerical position is a 2. These three digits 1, 0, 3 will be set into the storage device or scaling chain 19. However, when the next line representing a +X prefix character is read, the relay R17 will again be energized so that its contacts R17*d* (FIG. 5B) close to create a signal on the clear terminal TC. This will reset the scaling chain 19 to its zero state, in effect clearing or destroying the stored characters 1, 0, 3.

The same operation occurs when the next four lines of block 3 are read. The digits 1, 0, 2, 7, the last of which is erroneous, will be set into the storage device, but the reading of the succeeding prefix character +X will cause clearing and resetting of the storage device to its zero state. Therefore, when the following characters shown in the third block of FIG. 2, namely, 1, 0, 2, 3, 4, are read by the tape reader, the scaling chain 19 will be set in accordance with those digits, and the member 10 will subsequently be moved to a positive position represented by those digits.

Because the reading of a prefix character always clears the storage means or scaling chain 19 which is set to numbers represented by characters following a prefix character, and because the operation of the phase shift decoder 18, 19 and the associated servomechanism is not initiated until a complete suffix code (an S character followed by two numerical digit characters) is read, the control apparatus here described completely ignores any errors which may appear on the tape. It is not necessary to erase, punch over, or cut and splice out of the tape any erroneous lines which may be produced therein in the course of tape preparation. The operator need only, after making an error, continue on to type in a complete set of correct data, i.e., a prefix character followed by the correct numerical digits.

The present system also makes it convenient to correct errors which may be made in punching suffix code information into the tape 35. As shown for the third block in FIG. 3, the desired suffix code is S06. Suppose, as shown, the operator punches the characters S, 1 into the tape 35 instead of the correct first two characters S, 0. Recognizing this error, the operator need only back up the tape one line and punch a "void" code into the row which previously contained the erroneous 1 character representation. He then punches the correct three suffix code digits, namely S, 0, 6. When the punched tape reader reads the first S character, the relay R25 will be picked up and sealed in as previously described. However, when the punched tape reader reads the line following that first S character, it will sense a hole in the first seven columns of the tape and thus will produce a momentary grounding of the void terminal TV. This terminal, as shown in FIG. 5B, leads through a relay coil R34 to the positive voltage terminal B+. Therefore, reading of a "void" code on the punched tape will result in momentary energization of the relay R34 and momentary opening of the contacts R34*a* in series with all of the relay coils R25 through R31. Therefore, the relay coil R25 which was previously picked up (and any other of the relays R26 through R31 previously picked up) will be dropped out, placing the relays R25 through R31 in their original condition. Therefore, as the tape reader reads the three lines following the "void" line, the suffix code S06 will be set into and stored by the relays R25 through R31, as previously described.

As indicated above, the first numerical character in a suffix code which follows the S character is always either a 0 or a 1. The second character may in the present instance have any value 0 through 9. Thus, there are sixteen possible suffix codes S00 through S15 which can be placed in any one block of the tape and which will serve when read by the punched tape reader to initiate the operation of the phase shift decoder 18, 19 and the associated servomechanism.

Recognizing that relay R26 is picked up and sealed in in response to a first digit following an S character which has the value 0, that the relay R27 is picked up and sealed in when the first digit following the S has the value 1, and that the relays R28 through R31 are picked up and sealed in whenever the second digit following an S character has one of the values assigned to the associated terminals (i.e., T0, 1, 8, 5; T5, 2, 9, 6; T3, 6, 7, 8; and T0, 4, 7, 9; respectively) it will be seen that the reading of any suffix code S00 through S15 will result in the relays R26 through R31 being picked up in the uinque combinations shown by the following table:

*Table II*

| Suffix Code | R26 | R27 | R28 | R29 | R30 | R31 | Actuated Auxiliary Device |
|---|---|---|---|---|---|---|---|
| S00 | x | ------ | x | ------ | ------ | x | AD0 |
| S01 | x | ------ | x | ------ | ------ | ------ | AD1 |
| S02 | x | ------ | ------ | x | ------ | ------ | AD2 |
| S03 | x | ------ | ------ | ------ | x | ------ | AD3 |
| S04 | x | ------ | ------ | ------ | ------ | x | AD4 |
| S05 | x | ------ | x | x | ------ | ------ | AD5 |
| S06 | x | ------ | ------ | x | x | ------ | AD6 |
| S07 | x | ------ | ------ | ------ | x | x | AD7 |
| S08 | x | ------ | x | ------ | x | ------ | AD8 |
| S09 | x | ------ | ------ | x | ------ | x | AD9 |
| S10 | ------ | x | x | ------ | ------ | x | AD10 |
| S11 | ------ | x | x | ------ | ------ | ------ | AD11 |
| S12 | ------ | x | ------ | x | ------ | ------ | AD12 |
| S13 | ------ | x | ------ | ------ | x | ------ | AD13 |
| S14 | ------ | x | ------ | ------ | ------ | x | AD14 |
| S15 | ------ | x | x | x | ------ | ------ | AD15 |

x denotes relay energized.

The suffix code relays R26 through R31 may thus be employed to selectively energize any one of a plurality of auxiliary devices AD0 through AD15 assigned to respectively correspond to the suffix codes S00 through S15. As shown in FIG. 6, relay contacts controlled by the relays R26 through R31 are connected in a decoding matrix between a point of ground potential and auxiliary devices AD0 through AD15 which lead to a point of positive voltage here represented conventionally by the symbol B+. The relay contacts shown in FIG. 6 are so organized that one and only one of the auxiliary devices AD0 through AD15 will be energized when the corresponding suffix code is read from the punched tape. For example, if the suffix code read from the tape is "S01," then the relays R26 and R28 will be picked up and sealed in, while all of the other relays R27, R29, R30, and R31 will remain deenergized. It will be seen from FIG. 6 that when the relays are energized in this combination, current may flow from the B+ source through the auxiliary device AD1, normally closed contacts R31*d*, R30*d*, R29*d* through the actuated contacts R28*d*, and through the actuated contacts R26*d* to a point of ground potential. Thus, only the device AD1 will be energized, and the remaining devices AD0 and AD2 through AD15 will remain deenergized. In like manner, it will be apparent from inspection of FIG. 6 that a corresponding one of the devices AD0 through AD15 will be energized whenever the one of the suffix codes S00 through S15 is read from the punched tape 35.

As an example of how the suffix codes may be employed to control auxiliary operations as the member 10 is moved to different positions, suppose it is desired in the control of the position of a machine tool table to turn on a coolant pump when the member is in one position, and to turn it off when it moves to the next position. Associated with the block of punched holes on the tape 35 which designates that the member 10 is to be moved to the first position would be a suffix code "S01" which, when read, would not only initiate operation of the phase shift decoder and positioning servomechanism, but would also result in energization of a relay coil R–80 (FIG. 1) which forms the auxiliary device AD1. Pick-up of this relay results in closure of its contacts R80*a* and energization of a starter solenoid 82 through normally closed relay contacts R83*a*. The solenoid 82 seals in through auxiliary contacts 82*c* controlled thereby and closes its contacts 82*a* and 82*b*, thus connecting an auxiliary motor 84 to a voltage source, and causing that motor to drive a coolant pump 85. Thus, the coolant pump 85 would be started automatically in response to reading of the suffix code "S01."

To turn off the coolant pump 85, the programmer who prepares the punched tape 55 would employ, as the suffix code of a block punched therein, the characters "S02." When this particular suffix code S02 is read from the punched tape, it will result in the energization of a relay coil R83 contained within the auxiliary device AD2, and in opening of normally closed relay contacts R83*a*. With this, the solenoid 82 is deenergized and the contacts 82*a*, 82*b* opened so that the operation of the motor 84 and the coolant pump 85 is terminated.

From this example, it will be readily apparent that the person who prepares the program and the punched tape 35 in the first instance can preselect any one of the suffix codes S00 through S15 for each block of information. The response to such suffix codes is always to initiate the operation of the phase shift decoder 18, 19 and the associated servomechanism, but the response to the different suffix codes is unique in energizing different ones of the auxiliary devices AD0 through AD15. And the energization of these auxiliary devices may be caused to effect the actuation or deactuation of various instrumentalities associated with the control system. In the exemplary case of a machine tool control system, the different auxiliary devices AD0 through AD15 might effect actuation and deactuation of a coolant pump, a chip conveyor, a column or headstock clamp, or a tool changing mechanism. The present system is one, therefore, which not only makes it possible for errors inadvertently committed in the preparation of the tape 35 to be left in the tape with assurance that they will be ignored by the control system, but also one which utilizes the suffix codes to selectively actuate any one of a plurality of auxiliary devices.

I claim as my invention:

1. In apparatus for changing a condition in accordance with successive sets of signals, each set including at least one prefix signal followed by a plurality of value signals and a suffix code signal, the combination comprising a storage device, means for clearing said storage device in response to each prefix signal, means for setting said storage device in accordance with successive value signals, normally inactive means responsive to the value signal information contained in said storage device for changing said condition according to the setting of said storage device, and means responsive to a suffix code signal for initiating operation of said condition-changing means, whereby any set of signals which includes more than one prefix signal will cause said condition to be changed only in accordance with the value signals which appear subsequent to the last prefix signal in the set.

2. In apparatus for changing a condition in accordance with successive blocks of information on a punched tape or the like, each block including at least one prefix character followed by a plurality of value characters and a suffix character, the combination comprising a punched tape reader for producing signals corresponding to the characters appearing successively on said tape, a storage device, means responsive to each prefix signal produced by said reader for setting said storage device in accordance with the value signals produced by said reader subsequent to that prefix character, normally inactive means responsive to the value signal information contained in said storage device for changing said condition according to the setting of said storage device, and means responsive to a suffix signal produced by said reader for initiating operation of said condition-changing means, whereby the apparatus responds only to the value characters on said tape which follow the last prefix character in a block.

3. In apparatus for changing a condition in accordance with successive blocks of information on a punched paper tape or the like, certain ones of said blocks including successive representations of a first prefix character followed by an erroneous set of value characters and a second prefix character followed by a correct set of value characters and a suffix character, the combination comprising a reader including means for producing successive signals corresponding to the characters appearing successively on said punched tape, a storage device, means responsive to each prefix signal produced by said reader for clearing out information previously stored in said device, means responsive to value signals produced by said reader subsequent to a prefix signal for storing in said device information corresponding to the characters represented by such value signals, normally inactive means responsive to the value signal information contained in said storage device for changing said condition to agree with the information stored in said device, and means responsive to a suffix signal produced by said reader for initiating operation of said condition-changing means, whereby the apparatus ignores erroneous sets of value characters.

4. In apparatus for translating a movable member to different positions, the combination comprising a record device having a prefix character, position characters, and suffix code characters represented successively thereon, means for reading the characters from said record device and producing successive corresponding signals, a storage device, means for clearing said storage device in response to a prefix character signal produced by said reading means, means for setting said storage device according to position characters produced by said reading means, normally inactive means for translating said member to a position corresponding to the setting of said storage device, and means for initiating operation of said translating means only in response to suffix code signals produced by said reading means, whereby the apparatus ignores all position characters on said record device except those sets which immediately precede a suffix code character.

5. In apparatus for changing a condition to different values, the combination comprising a digital record having successive blocks of information thereon, each block including successive representations of at least one prefix character, at least one value character, and a suffix character, a reader including means for producing successive signals corresponding to the successive characters represented on said record, a pair of like scaling chains, means responsive to any prefix signal produced by said reader for setting both of said chains to the same first count, means responsive to value signals produced by said reader for setting one of said chains to a count which differs from said first count in the amount representative of the corresponding value characters, means responsive to a suffix signal produced by said reader for passing an identical stream of recurring signals to both said scaling chains, and means for changing said condition according to the difference in phase of the output signals produced by said scaling chains, whereby said condition is changed to agree only with the value characters which follow the last prefix character before the suffix character in any block of said record.

6. In apparatus for changing a condition to different values in response to successive sets of digital information, the combination comprising a record device having successive blocks of digitally-represented information thereon, each block including representations of at least one prefix character with each such prefix character followed by value characters and the last set of value characters followed by a suffix character, a reader including means for producing successive signals corresponding to the successive characters on said record device, first and second like scaling chains, a data distributor, means for homing said distributor and setting both said chains to the same predetermined count in response to each prefix signal produced by said reader, means responsive to each valve signal for stepping said distributor and passing the signal therethrough to condition said second chain so that the latter is set to a count which differs from said predetermined count by an amount represented by the value characters, means responsive to a suffix signal produced by said reader for passing identical recurring signals to both said scaling chains, and means for changing said condition according to the difference in phase of the output signals of said scaling chains, whereby said condition is adjusted to agree only with the last set of value characters which appear in any block of said record device.

7. In apparatus for changing a condition to different values in response to successive sets of digital information, the combination comprising a record having successive blocks of digitally-represented information thereon, each block including representations of at least one prefix character with each prefix character followed by value characters and the last set of value characters followered by a suffix character and at least one code character, a reader including means for producing successive signals corresponding to the successive characters on said record, a storage device, means for clearing said storage device in response to each prefix signal produced by said reader, means for setting said storage device in response to value signals produced by said reader subsequent to a prefix signal, normally inactive means responsive to the value signal information contained in said storage device for changing said condition according to the setting of said storage device, means responsive to a suffix signal and at least one code signal for initiating operation of said condition-changing means, a plurality of auxiliary devices, and means responsive to different code signals produced by said reader after a suffix signal for actuating different ones of said auxiliary devices.

8. In apparatus for changing a condition according to successive blocks of information, each block including successive signals which may represent at least one prefix character each followed by a set of value characters, a suffix character followed by a set of code characters and a "void" character, the combination comprising a storage device, means for clearing said storage device in response to each prefix signal, means for setting said storage device according to value signals received after a prefix signal, normally inactive means responsive to the value signal information contained in said storage device for changing said condition according to the setting of said storage device, a second storage device, means for setting said second storage device in response to a suffix signal and a set of code signals so that the state of said second storage device corresponds to the code signals, means responsive to a "void" signal for clearing said second storage device, and means responsive to a setting of said second storage device according to a complete set of code signals for initiating operation of said condition-changing means.

References Cited by the Examiner

UNITED STATES PATENTS

| | | | |
|---|---|---|---|
| 2,552,629 | 5/51 | Hamming et al. | 340—147 |
| 2,755,422 | 7/56 | Livingston | 179—100.2 |
| 2,849,532 | 8/58 | Hennig | 340—147 |
| 2,942,242 | 6/60 | Sharp | 340—172.5 |

NEIL C. REID, *Primary Examiner.*

IRVING, S. SRAGOW, ROBERT H. ROSE, *Examiners.*